(12) United States Patent
Weickert

(10) Patent No.: US 7,776,973 B2
(45) Date of Patent: Aug. 17, 2010

(54) PROCESS FOR THE CATALYTIC POLYMERIZATION OF OLEFINS, A REACTOR SYSTEM AND ITS USE IN THE SAME PROCESS

(76) Inventor: Gunter Weickert, c/o Arnold & Seidsms, P.O. Box 18558, NL-2502 EN The Hauge (NL)

( * ) Notice: Subject to any disclaimer, the term of this patent is extended or adjusted under 35 U.S.C. 154(b) by 1018 days.

(21) Appl. No.: 10/560,190

(22) PCT Filed: May 12, 2004

(86) PCT No.: PCT/EP2004/005126

§ 371 (c)(1),
(2), (4) Date: Aug. 4, 2006

(87) PCT Pub. No.: WO2004/111096

PCT Pub. Date: Dec. 23, 2004

(65) Prior Publication Data
US 2007/0032616 A1 Feb. 8, 2007

(30) Foreign Application Priority Data
Jun. 6, 2003 (EP) .................................. 03076791

(51) Int. Cl.
C08F 2/34 (2006.01)
B01J 19/24 (2006.01)
C08F 2/38 (2006.01)
(52) U.S. Cl. ........................... 526/65; 526/88; 526/918; 422/131; 422/132
(58) Field of Classification Search .................... 526/88, 526/65, 918; 422/132, 131, 141
See application file for complete search history.

(56) References Cited

U.S. PATENT DOCUMENTS

| 2,763,599 | A | 9/1956 | Matheson el al. |
| 5,656,243 | A | 8/1997 | Papa et al. |
| 6,469,110 | B1 | 10/2002 | Harlin et al. |
| 7,414,098 | B2 * | 8/2008 | Covezzi et al. ................ 526/65 |

FOREIGN PATENT DOCUMENTS

| DE | 3916325 A | 11/1990 |
| EP | 0517868 A1 | 12/1992 |
| WO | WO 00/02929 A | 1/2000 |
| WO | WO 00/69552 A | 11/2000 |
| WO | WO 02/41986 A | 5/2002 |

* cited by examiner

Primary Examiner—Fred M Teskin
(74) Attorney, Agent, or Firm—The Webb Law Firm

(57) ABSTRACT

The invention relates to a process for the catalytic polymerization of olefins, wherein olefins are contacted with a particulate catalyst in a fluidized bed and in a moving bed such that the residence time in the fluidized bed and the residence time in the moving bed are independently controlled, to a reactor system comprising a fluidized bed reactor provided with a reactant inlet, a product outlet and means for maintaining a fluidized bed in the fluidized bed reactor and with a moving bed reactor provided with an inlet directly connected to the fluidized bed reactor and an outlet connected to the fluidized bed reactor such that the residence time in the fluidized bed reactor and the residence in the moving bed reactor are independently controlled, and to its use for the catalytic polymerization of olefins.

18 Claims, 5 Drawing Sheets

Figure 1:
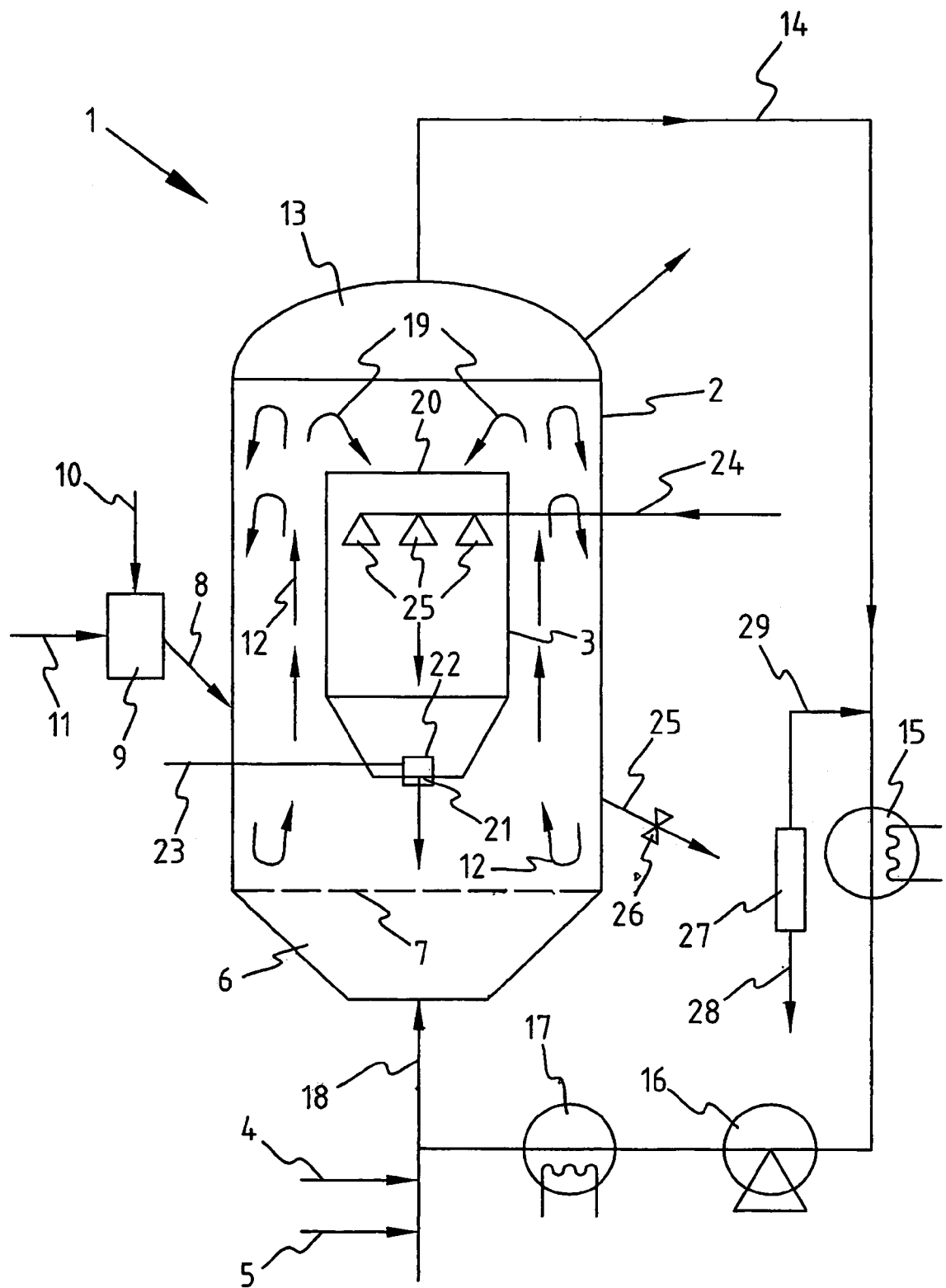

PROCESS FOR THE CATALYTIC POLYMERIZATION OF OLEFINS, A REACTOR SYSTEM AND ITS USE IN THE SAME PROCESS

The present invention relates to a process for the catalytic polymerization of olefins, to a particular reactor system and to the use of such reactor system for the catalytic polymerization of olefins.

The catalytic polymerization of olefins uses a catalyst of the Ziegler-Natta type. New generations of catalysts for olefin polymerization including single-site catalysts referred to as Ziegler-Natta catalysts have been developed in view of a higher activity and/or selectivity. During the catalytic polymerization is the olefin composition around the catalytic particle substantially constant. Reactor gasses exiting the reactor are recompressed and recycled. Make-up monomer and optionally hydrogen are added as needed. Entrained particles are separated by an interposed cyclone and recycled to the polymerization reactor.

Polyolefins produced using a recent generation of Ziegler-Natta catalysts have a relatively narrow molecular weight distribution. The breadth of the molecular weight distribution influences the rheology behavior and the final mechanical particles of the produced polyolefins.

In order to obtain a broader or bimodal molecular weight distribution, use is made of different reactor conditions, such as different concentrations for monomer, comonomer and/or hydrogen. Another option is the use of specific and/or combined catalysts.

Traditionally, series of reactors are used for applying different reaction conditions during the catalytic polymerization in order to obtain a broad or bimodal molecular weight distribution.

The use of a fluidized bed reactor for the gasphase catalytic polymerization of olefins is well known in the art (EP-A-0 301 872).

Productivity of poly olefins is low due to heat transport by convective flow and gas flow limitations in relation to the generation and maintenance of the fluidized bed.

Productivity of polyolefins may be increased by a catalytic polymerization in the condensed mode in which monomer or comonomer are added such that an injected liquid evaporates in the fluidized bed reactor (U.S. Pat. No. 5,405,922). The addition of liquid reactants or inert compounds may effect the maintenance of the fluidized bed. WO 02/41986 discloses the use of connecting pipes via which more liquid components can be supplied to the reactor without interfering with the fluidized bed stability. This condensed mode catalytic polymerization results in a higher productivity than in known reactors of equal dimensions.

In order to obtain a broad molecular weight distribution or a bimodal molecular weight distribution U.S. Pat. No. 5,326,835 discloses the use of a multi-stage process comprising for instance two fluidized bed reactors which are used in series.

U.S. Pat. No. 5,698,624 discloses a process and an apparatus for the gas phase polymerization of olefins in which the fluidized bed reactor and a moving bed reactor form a loop structure in which the entire product from the fluidized bed is passed through a cyclone in order to separate the product particles to be directed to the moving bed from the gas fraction to be recycled to the fluidized bed. In the fluidized bed reside so called fast or turbulent fluidization conditions which require particular unit operations for maintenance of the fast fluidization conditions. Furthermore, the entire product stream from the fluidized bed reactor is passed through the downward moving bed, so that the product obtained has been subjected to substantially the same number of cycles in the fluidized bed reactor and in the moving bed reactor. Thus the residence time in both reactors cannot be independently controlled.

The present invention has for its object to provide a process and a reactor system inter alia suitable for the gas phase catalytic polymerization of olefins which allows the production of a variety of polyolefins, such as monomodal and bimodal products with a desired polydispersity and/or bimodality.

This is obtained with a process for the catalytic polymerization of olefins, wherein olefins are contacted with a particulate catalyst in a fluidized bed and in a moving bed such that the residence time in the fluidized bed and the residence time in the moving bed are independently controlled. In the fluidized bed and in the moving bed the residence times may be controlled and adjusted relative to the total process residence time independently. During the total residence time of the process the polymeric particles are recycled during a number of cycles. The number of cycles in the fluidized bed and in the moving bed may be selected as desired with the present process according to the invention. Thus, it is possible to build up polymeric particles with the desired number and thickness of polymeric layers formed consecutively in the fluidized bed and moving bed reactors.

According to a preferred embodiment is the residence time in the moving bed independently controlled, for instance by controlling the amount of polymeric particles entering the moving bed but more preferably by controlling the outflow of polymeric particles out of the moving bed. The control of outflow rate may have the form of adjusting the opening in the outlet of the moving bed.

In the moving bed are the catalytic polymerization conditions different compared to these in the fluidized bed. First, because the catalytic particles have a higher density in the moving bed. Furthermore, in order to apply different polymerization conditions use is made of a separation fluidum in order to create different catalytic polymerization conditions. For example, a polymerization carried out at a lower concentration of a chaingrowth terminating agent such as hydrogen. Applying a separating fluidum to the moving bed results in a separation in reaction conditions between the fluidized bed and the moving bed and thereby in the residing polymerization conditions in the fluidized bed and in the moving bed. Preferably the separation fluidum is added to the top of the moving bed and forms a cushion on the moving bed through which cushion of separating fluidum the particulate polymeric material settles on the forming moving bed. The separation fluidum may be a gas or a liquid. The separation fluidum may be inert to the catalytic polymerization, such as nitrogen and $C_1$-$C_{12}$-alkane.

The separation fluidum may be reactive, such as monomer, comonomer such as $C_1$-$C_{12}$-alkylene or mixtures thereof. Mixtures of inert and catalytic polymerization reactive separation fluidum may be used as desired.

Preferably, use is made of a separation fluidum which is a liquid which evaporates under the conditions residing during the catalytic polymerization in the moving bed. Accordingly, during evaporation a gas cushion of separating fluidum is formed and at the same time a cooling of the exothermic polymerization reaction occurs with at the same time a much higher reactant concentration when using reactive separation fluidum.

The addition of separation fluidum but also of the reactant to both fluidized bed and moving bed may be such that in the fluidized bed and/or in the moving bed a condensed mode polymerization occurs which is beneficial to the productivity and selectivity.

Another aspect of the present invention relates to a reactor system comprising a fluidized bed reactor provided with a reactant inlet, a product outlet and means for maintaining fluidization in the fluidized bed reactor and with a moving bed reactor provided with an inlet directly connected to the fluidized bed reactor and an outlet connected to the fluidized bed reactor such that the residence time in the fluidized bed reactor and the residence in the moving bed reactor are independently controlled. In this reactor system the moving bed is connected to the fluidized bed such that as desired part or all fluidized bed reactant is passed through the moving bed. The residence time in the moving bed reactor is controlled by controlling the outflow rate at the outlet of the moving bed reactor. When the moving bed reactor is filled with particulate polymeric material then no further particulate material from the fluidized bed reactor may be added to the moving bed reactor and is to be recycled in the fluidized bed reactor. The extent of fluidization and filling of the fluidized bed reactor determines the residence time of the particulate polymeric material in the fluidized bed reactor prior to changing over into the moving bed reactor. In the moving bed reactor the residence time is dependent on the outflow rate and the particulate polymeric material follows one cycle within the moving bed reactor after entering it.

When in the fluidized bed reactor and in the moving bed reactor different polymeric reaction conditions reside, then the polymeric particle formed will comprise layers of different polymeric material due to the different polymeric material formed on the particle.

In order to independently control the residence time in the fluidized bed reactor and in particular in the moving bed reactor, the inlet of the moving bed reactor is arranged in the fluidized bed reactor so that part of the material from the fluidized bed reactor may be transferred into the moving bed reactor whereas the other remaining part is further fluidized and mixed in the fluidized bed reactor. Generally, the material leaving the moving bed reactor is transferred into the fluidized bed reactor and ultimately removed from the fluidized bed reactor. However, product may also be removed from the moving bed reactor.

Various orientations of the fluidized bed reactor and of the moving bed reactor are contemplated while still the residence time in the fluidized bed reactor and in the moving bed reactor may be controlled independently. In one embodiment the moving bed reactor is arranged within the fluidized bed reactor. In another embodiment the moving bed reactor is arranged around the fluidized bed reactor and has a substantially annular configuration. In another embodiment, the moving bed reactor is arranged adjacent or even outside the fluidized bed reactor while its inlet and optionally its outlet are arranged in the fluidized bed reactor. Preferably (as discussed above), the moving bed reactor is provided at least at its inlet with means for supplying the separation fluidum. This separation fluidum is preferably a gas or liquid and selected from the group comprising an inert gas or liquid, such as nitrogen and $C_1$-$C_{12}$-alkane, or $C_1$-$C_{12}$-alkylene.

The moving bed reactor may be provided with a diverging section such that as from its inlet the reactor volume increases thereby allowing a better separation of particulate material entering the moving bed from material which is recycled in the fluidized bed. In another embodiment, the moving bed reactor may be provided with a converging section as from its inlet providing a more stable fluidized bed around the moving bed reactor.

In order to control residence time in the moving bed reactor, its outlet is preferably provided with means for controlling the outflow rate of particles from the moving bed. Those outflow rate controlling means may have the form of a valve or any form of construction element suitable for controlling the outflow rate.

Finally, the present invention relates to the use of the afore mentioned reactor system in the catalytic polymerization of olefins.

Figure 2:
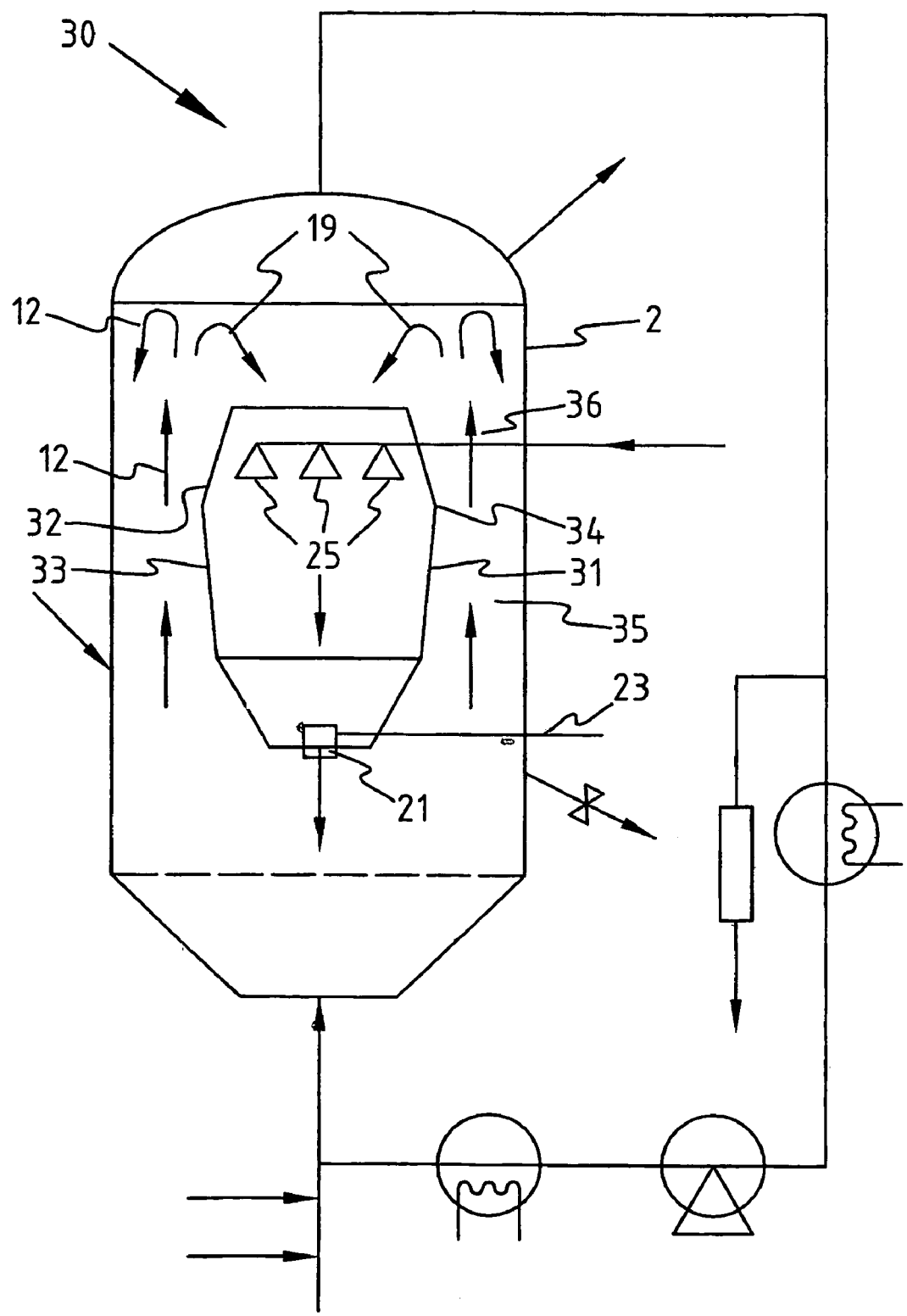
Figure 5:
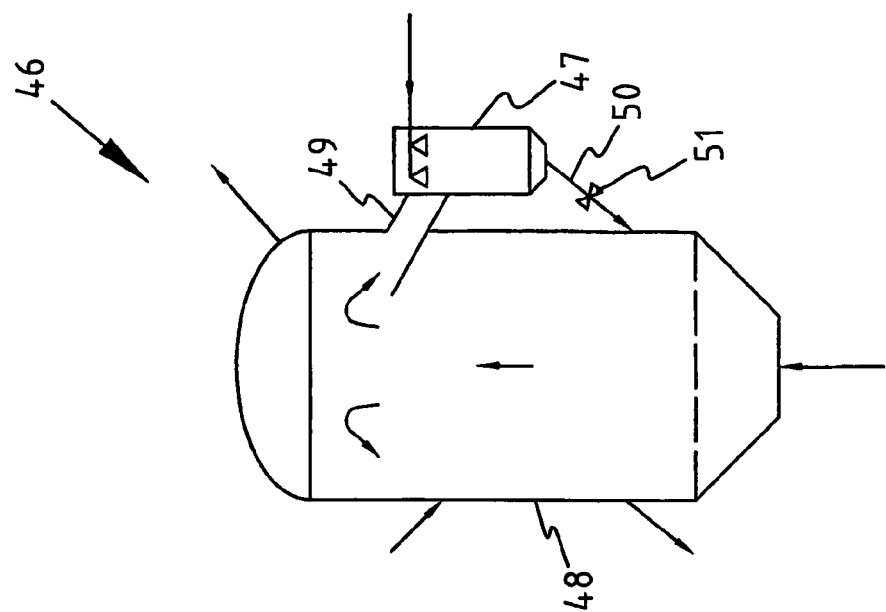
Figure 4:
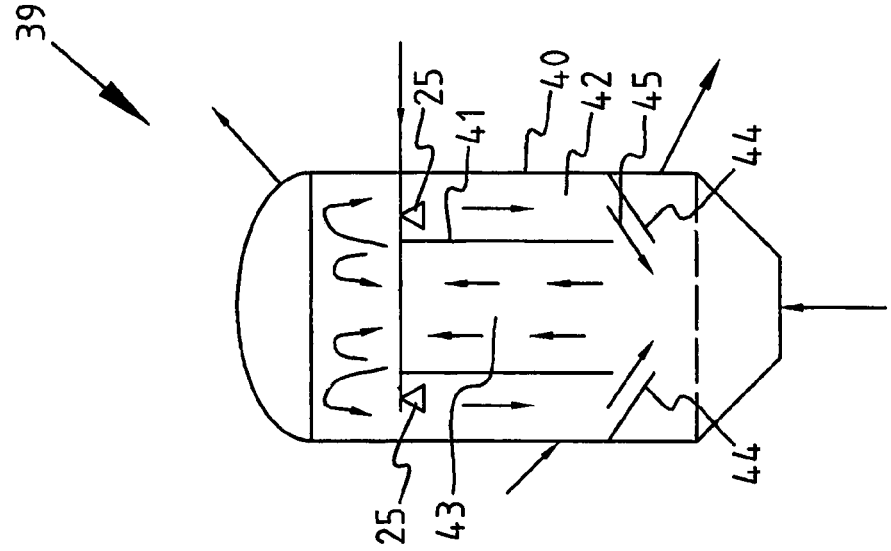
Figure 3:
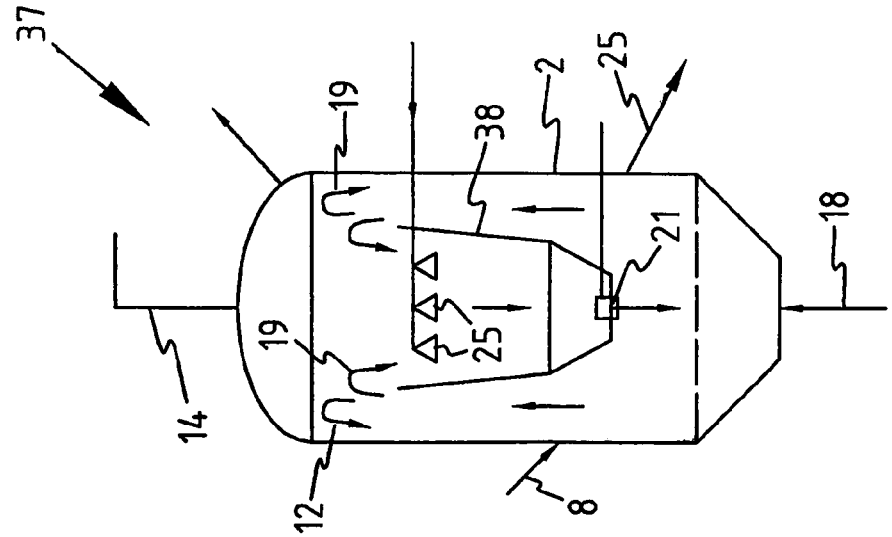
Figure 6:
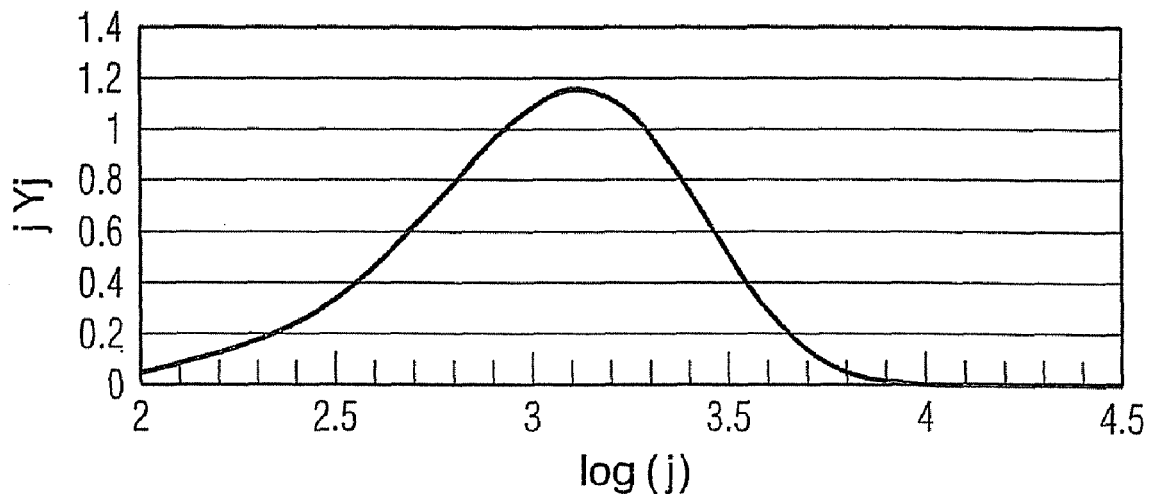
Figure 7:
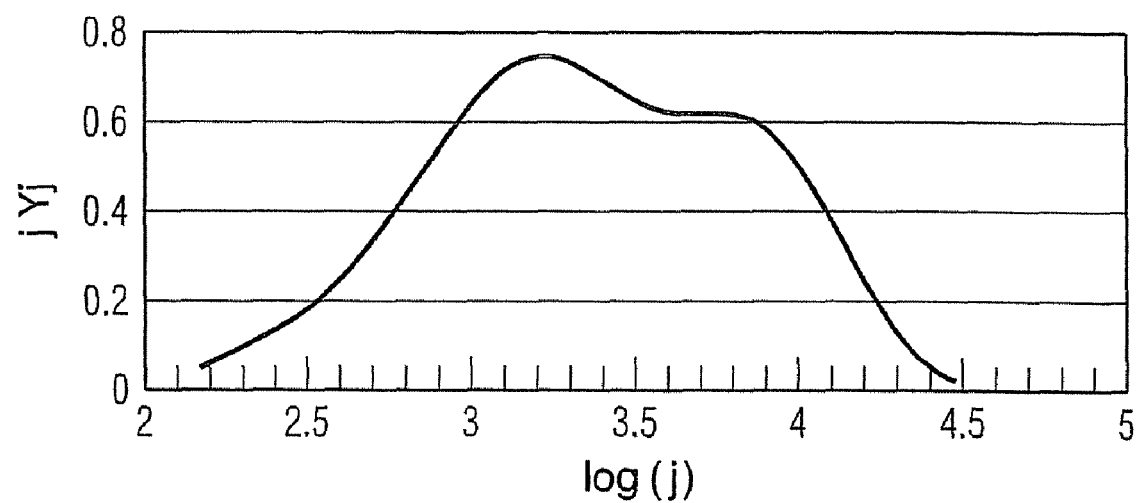
Figure 8:
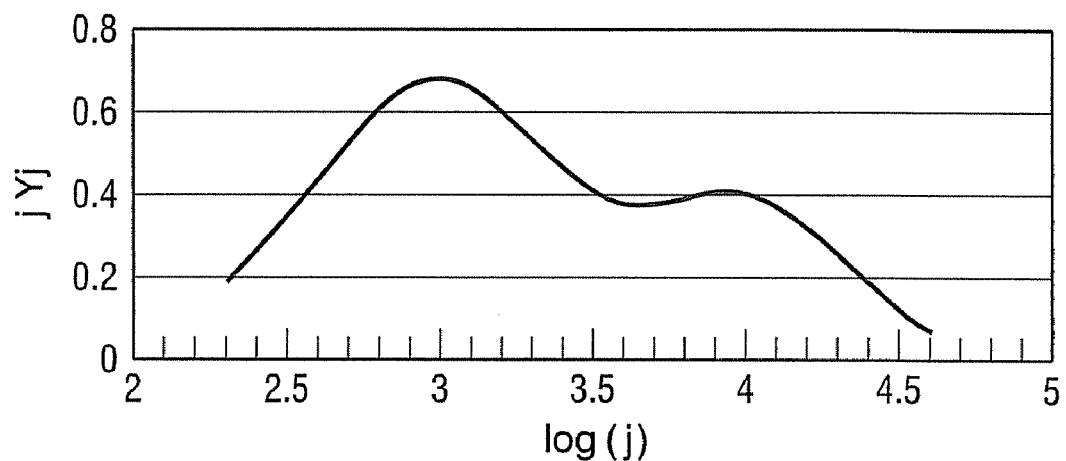
Figure 9:
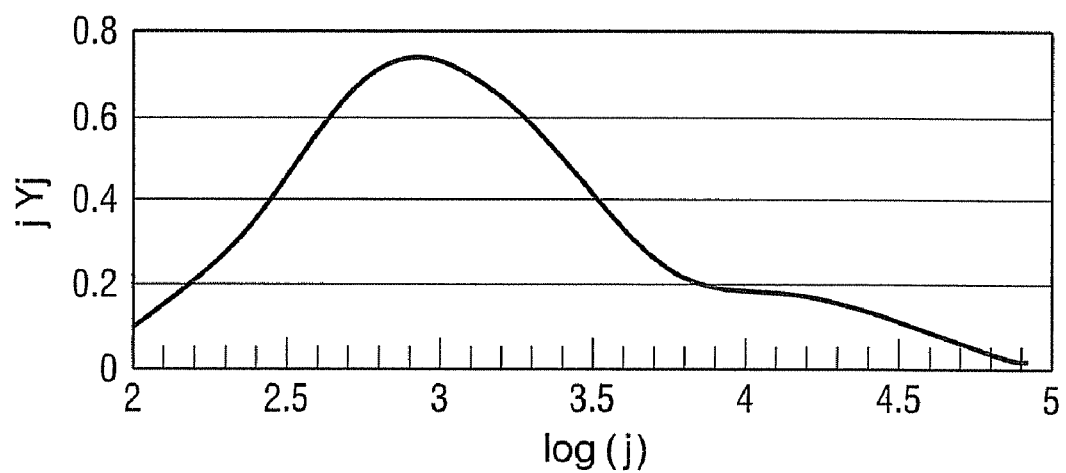

Mentioned and other inventive features and advantages of the process and the reactor system according to the invention are further explained by way of several embodiments given for illustrative purposes and without the intention to limit the invention thereto, while making references to the figures. In the figures are:

FIGS. 1 and 2 schematic diagrams of reactor systems according to the invention for the catalytic polymerization of olefins;

FIGS. 3, 4 and 5 other reactor systems; and

FIGS. 6-9 molecular weight distributions obtained with a process exemplified in the examples 1, 2, 3 and 4, respectively.

FIG. 1 shows a reactor system 1 for the catalytic polymerization of olefins. Olefins used in the process according to the invention comprise $C_2$-$C_{12}$-olefins, preferably $C_2$-$C_8$-olefins such as ethylene, propylene, butene-1, pentene-1, hexene-1, 4-methyl, pentene-1 and octene. These olefins may be used for the production of homopolymers. Copolymers may be produced by using for instance ethylene and/or propylene in combination with other $C_2$-$C_8$-alpha-olefins. Higher olefins may be used for co-polymerization, such as dienes, for instance 1,4-butadiene, 1-6-hexadiene, dicyclopentadiene, ethylidene norbornene and vinyl norbornene.

For this catalytic polymerization Ziegler-Natta-catalysts are used which are conventional catalysts available in the art and selected as desired.

The reactor system 1 comprises a fluidized bed reactor 2 within which is centrally arranged a moving bed reactor 3.

Monomer is entering the fluidized bed reactor 2 via line 4 and optionally via line 5 inert gas, comonomer and/or hydrogen.

Via a lower space 6 and a gas distribution plate 7 the reaction gas enters the fluidized bed reactor 2. Via line 8 the catalyst system is added from a unit 9 supplied via line 10 and other catalyst components via line 11. Sidewise around the moving bed reactor 3 is generated and maintained a fluidized bed of catalytic particles on which particles due to the polymerization reaction polymer is formed. The composition of the polymer formed is dependent on the residing concentration of the monomer, comonomer, inert and hydrogen. The maintained fluidized bed is visualized by the arrows 12. At the top of the fluidized bed reactor particles are separated from gas in a disengaging section 13. Gas leaves the fluidized bed reactor via the recirculation line 14, is optionally cooled in a heat exchanger 15, compressed in a compressor 16 and optionally after further cooling in heat exchanger 17 re-added to the fluidized bed reactor 2 via its inlet 18.

Part of the particulate material in the fluidized bed reactor 2, visualized by the arrows 19 enters the moving bed reactor 3 and forms a bed 20 of settled polymeric particles which move slowly downwardly in a more or less plug stream towards the outlet 21 which is partly closed off by a valve 22 controlled via a control line 23. On the downwardly moving bed of polymeric particles in the moving bed is formed a cushion of separation fluidum which is added via the line 24 and the nozzles 25. This separation fluidum is in this case a liquid which evaporates under the conditions residing at the top of the moving bed. The top part of the moving bed, above the nozzles 25, is preferably fluidized by the upstreaming evaporated separation fluidum.

After a sufficient total residence time in both the fluidized bed reactor 2 and moving bed reactor 3, polymer is removed via the outlet 25 provided with a valve 26. In a separator 27 polymeric material is separated and removed via outlet 28 whereas gaseous material is recycled via line 29 and line 14.

FIG. 2 shows another embodiment of the reactor system 30 comprising the fluidized bed reactor 2 and moving bed reactor 31 centrally arranged within the fluid bed reactor 2. The moving bed reactor 31 has a first diverging upper section 32 and a second converging section 33.

Due to the diverging section 32 and converging section 33 is formed a complementary structure in the fluidized bed reactor whereby is formed a constrainment 34 dividing the fluidized bed in a lower section 35 and upper section 36 which is beneficial to the stability of the fluidized bed formed.

In the reactor system 37 shown in FIG. 3 the moving bed reactor 38 only has the form of a cup shape whereby more material from the fluidized bed reactor 2 is transferred into the moving bed reactor 38.

In the reactor system 39 as shown in FIG. 4, the moving bed reactor is formed between an outer wall 40 and a cylindrical inner wall 41, so that the moving bed reactor 42 has the form of an annular or hollow cylinder with the fluidized bed reactor 43 centrally arranged. The outlet 44 of the moving bed reactor 42 is a constrainment in the form of a narrow annular slot through which in a defined outflow rate particulate material following the arrow 45 flows back into the fluidized bed reactor 43.

Finally, the reactor system 46 as shown in FIG. 5 comprises a separate cylindrical moving bed reactor 47 arranged outside the fluidized bed reactor 48 and is connected to it via an inlet 49 and an outlet 50. The outlet 50 is provided with a control valve 51 for controlling the outflow of particulate material from the moving bed reactor into the moving fluidized bed reactor.

All reactor types shown in FIGS. 1-5 provide substantially the same polymer quality if they are operated under similar conditions. Under nearly isothermal conditions, beside typical parameters like temperature, pressure, gas and solid phase composition, "similar conditions" can be defined by the following major variables:
 a) average residence time of solid and gas phase in the whole system
 b) ratio (average fluid bed reactor residence time):(average moving bed reactor residence time)
 c) average number of powder cycles through fluidized bed and moving bed per average overall residence time
 d) amount of injected liquid
 e) ratio (amount of solids in fluid bed reactor):(amount of solids in moving bed reactor)

The fluidization behavior is influenced by the fluid bed reactor and moving bed reactor design, but is controllable in a wide range of geometric variables.

The results of the following examples did not substantially depend on the specific design when the reactor was operated under "similar conditions". Wall sheeting was never observed. Temperature gradients were always small under all conditions applied.

EXAMPLE 1

A pilot reactor characterized by an overall production of 20 kg per hour was operated at 75° C. and 28 bar pressure. The product P=(average residence time)×(polymerization rate) and was kept roughly constant—with about 25 cycles per average residence time of the whole system—for both fluid bed reactor and moving bed reactor by controlling the powder throughput in moving bed reactor. The gas composition at the reactor entry was kept constant at 88 mol % propylene and 12 mol % hydrogen.

First, the system has been operated without supplying separation fluidum via line 24. This leads to a relatively narrow molecular weight distribution shown in FIG. 2 with j being the chain length and Yj being the chain length distribution density function. The average molecular weight is low because of the relatively high hydrogen concentration of 12 mol % within the whole reactor area.

EXAMPLE 2

By feeding some more catalyst to the reactor and feeding liquid propylene as separation fluidum via line 24, the bimodal mode of operation was started under same conditions as described in example 1. The molecular weight distribution was broadened significantly, see FIG. 7, and the productivity reached 32 kg/hour after reaching steady state conditions.

The weight average chain length was about 4070 corresponding to a weight average molecular weight of about 170.000 g/mol. A polydispersity (of the MWD) of about 3.6 and bimodality was reached. In both examples 1 and 2, the ratio of polymer produced in fluid bed reactor and moving bed reactor was nearly the same.

EXAMPLE 3

A catalyst showing an intensive hydrogen response was used in configuration of FIG. 3. The reaction conditions were the same as described in example 2. Obviously, the production rate in fluid bed reactor was higher compared to moving bed reactor. Therefore, a more distinct bimodality was observed, and the low molecular weight peak is much higher than the high molecular weight part.

Consequently, the polydispersity was much higher and reached a value of about 5.6 at a weight average molecular weight of about 205.000 g/Mol.

EXAMPLE 4

Ethylene was polymerized at 90° C. and 22 bar. Only about 11 polymer cycles per average solid residence time were measured. The productivity (in steady state) was 16 kg polymer per hour. Liquid propane was used as separation fluidum. Because of the long residence time in the moving bed reactor part (at reduced monomer concentration and very low hydrogen concentration), the high molecular weight part is reduced, see FIG. 9, but (a weak) bimodality of the product has been observed. The weight average chain length was slightly above 4000, whereas the polydispersity was about 7.8.

The invention claimed is:

1. Process for the catalytic polymerization of olefins, wherein olefins are contacted with a particulate catalyst in a fluidized bed and in a moving bed such that the residence time in the fluidized bed and the residence time in the moving bed are independently controlled by controlling the inflow of polymeric particles into the moving bed or by controlling the outflow of polymeric particles out of the moving bed.

2. Process according to claim 1, wherein the residence time in the moving bed is independently controlled.

3. Process according to claim 1, wherein the residence time in the moving bed is controlled by controlling the outflow rate of particles from the moving bed.

4. Process according to claim 1, wherein the moving bed is separated from the fluidized bed by a separation fluidum.

5. Process according to claim 4, wherein the separation fluidum is supplied to the moving bed.

6. Process according to claim 4, wherein the separation fluidum is a gas or a liquid and selected from the group consisting of an inert gas or liquid, nitrogen, $C_1$-$C_{12}$-alkane, olefins, and mixtures thereof.

7. Process according to claim 6, wherein the separation fluidum is a liquid evaporating under the residing polymerization conditions.

8. Process according to claim 5, wherein liquid olefins are added as separation fluidum such that the polymerization in the moving bed is a condensed mode polymerization.

9. Process according to claim 1, wherein liquid olefins are added to the fluidized bed such that the polymerization in the fluidized bed is in a condensed mode polymerization.

10. Process according to claim 4, wherein the separation fluidum is a polymerization monomer or comonomer, or mixtures thereof.

11. Process according to claim 6, wherein the separation fluidum is $C_1$-$C_{12}$-alkylene.

12. Reactor system comprising a fluidized bed reactor provided with a reactant inlet, a product outlet and means for maintaining a fluidized bed in the fluidized bed reactor and with a moving bed reactor provided with an inlet directly connected to the fluidized bed reactor and an outlet connected to the fluidized bed reactor such that the residence time in the fluidized bed reactor and the residence in the moving bed reactor are independently controlled, wherein the moving bed reactor is provided with means for supplying a separation fluidum.

13. Reactor system according to claim 12, wherein the inlet of the moving bed reactor is arranged in the fluidized bed reactor.

14. Reactor system according to claim 12, wherein the outlet of the moving bed reactor is connected to the fluidized bed reactor.

15. Reactor system according to claim 12, wherein the moving bed is arranged in, around or adjacent to the fluidized bed reactor.

16. Reactor system according to claim 12, wherein the system comprises a separation fluidum and wherein the separation fluidum is a gas or liquid and selected from the group consisting of an inert gas or liquid, nitrogen, $C_1$-$C_{12}$-alkane, olefins and mixtures thereof.

17. Reactor system according to claim 12, wherein the inlet of the moving bed reactor is provided with a diverging section.

18. Reactor system according to claim 11, wherein the outlet of the moving bed reactor is provided with means for controlling the outflow rate of particles from the moving bed.

* * * * *

UNITED STATES PATENT AND TRADEMARK OFFICE
CERTIFICATE OF CORRECTION

PATENT NO. : 7,776,973 B2
APPLICATION NO. : 10/560190
DATED : August 17, 2010
INVENTOR(S) : Weickert Page 1 of 1

It is certified that error appears in the above-identified patent and that said Letters Patent is hereby corrected as shown below:

Title Pg, Item (76) Inventor: "Seidsms" should read -- Seidsma --

Column 8, line 26, Claim 18, "according to claim 11" should read -- according to claim 12 --

Signed and Sealed this

Thirtieth Day of November, 2010

David J. Kappos
*Director of the United States Patent and Trademark Office*